Nov. 22, 1949     R. M. GAMBLE     2,489,023
LATHE

Filed Jan. 24, 1946     6 Sheets-Sheet 1

Inventor
Ralph M. Gamble
by Wright, Brown, Quinby, May
Attys.

Nov. 22, 1949  R. M. GAMBLE  2,489,023
LATHE
Filed Jan. 24, 1946  6 Sheets-Sheet 2

Fig. 2

Inventor
Ralph M. Gamble
by Wright, Brown, Quinby May
Attys.

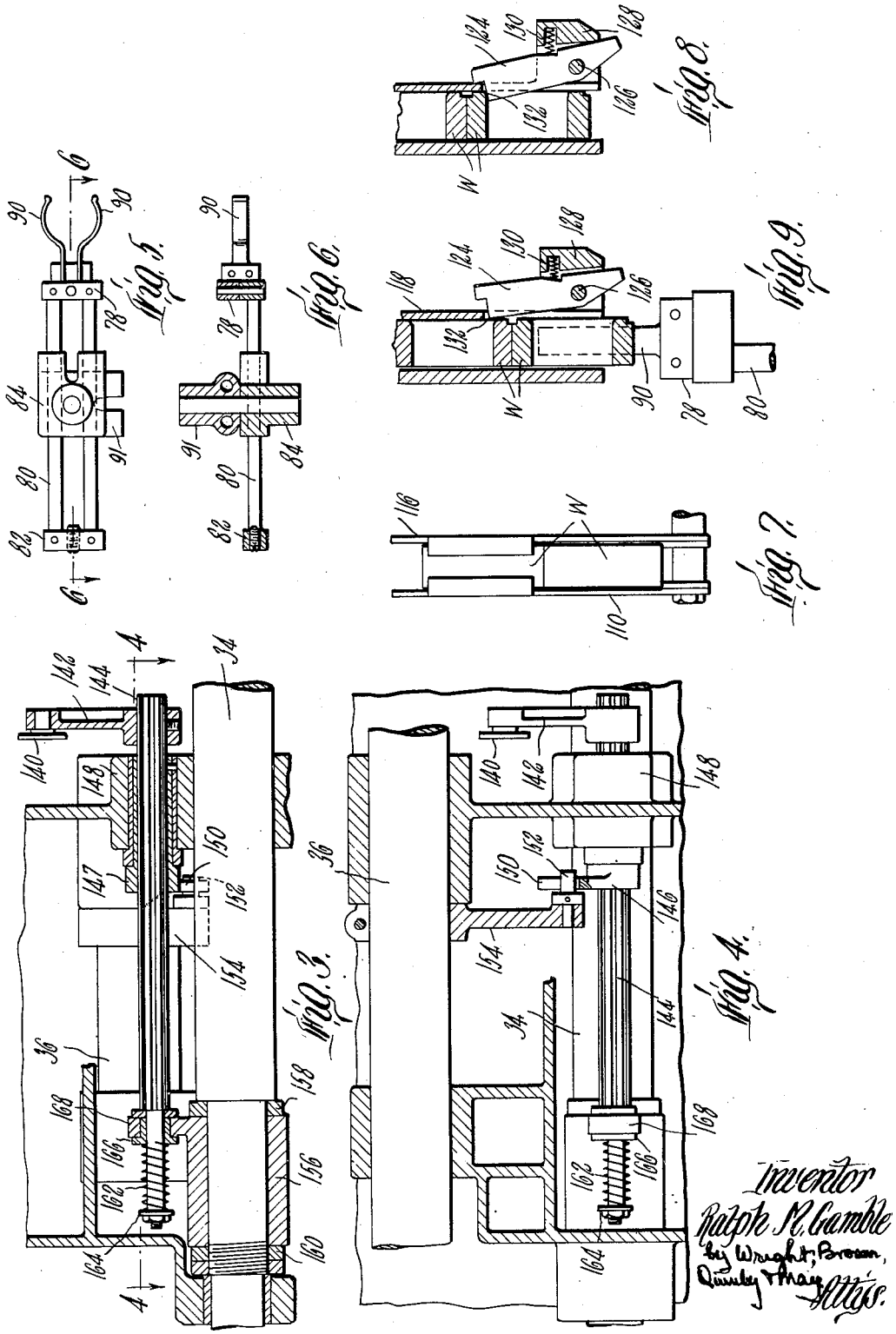

Nov. 22, 1949    R. M. GAMBLE    2,489,023
LATHE
Filed Jan. 24, 1946    6 Sheets-Sheet 4
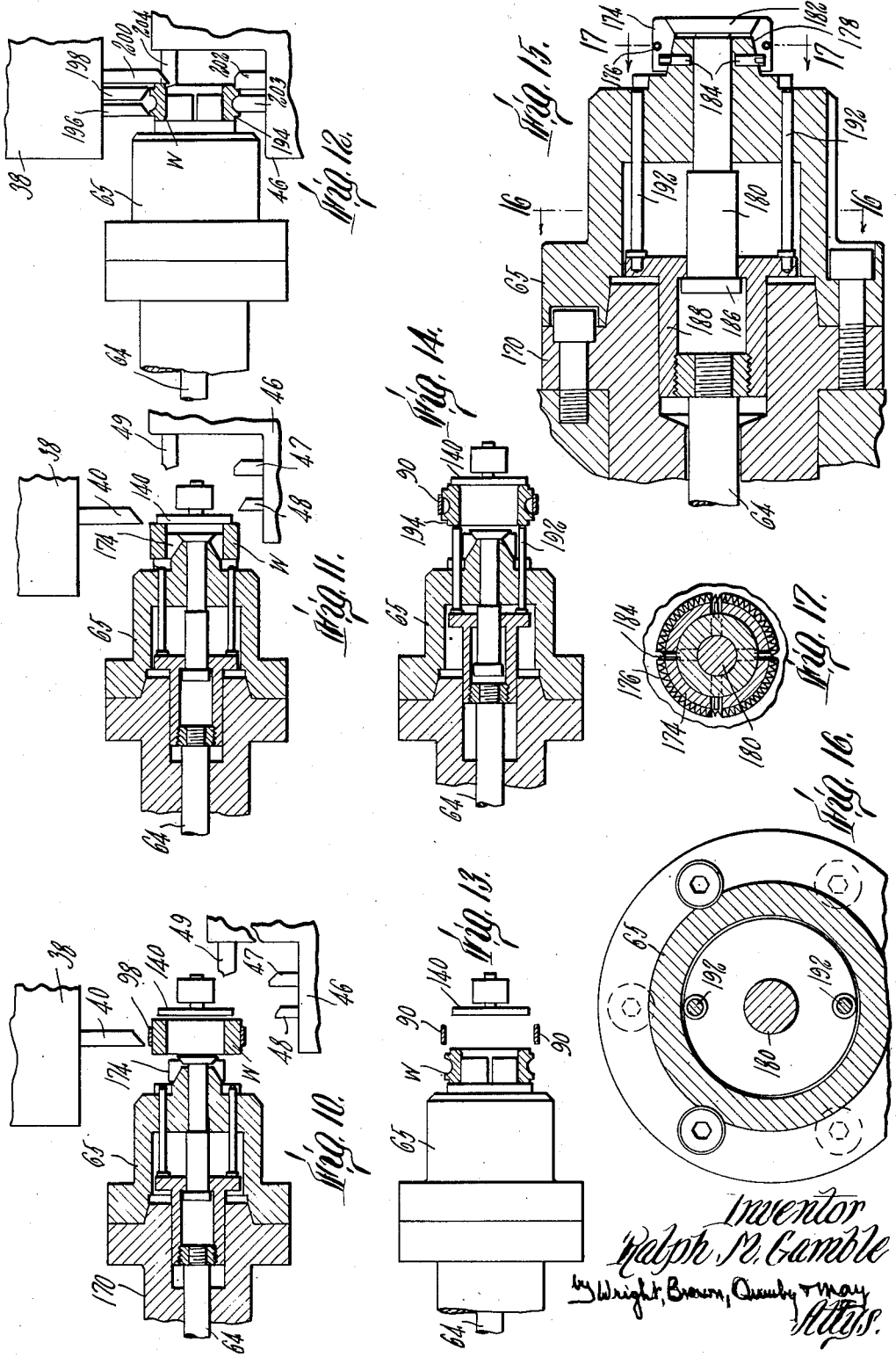

Nov. 22, 1949        R. M. GAMBLE        2,489,023
LATHE
Filed Jan. 24, 1946        6 Sheets-Sheet 5
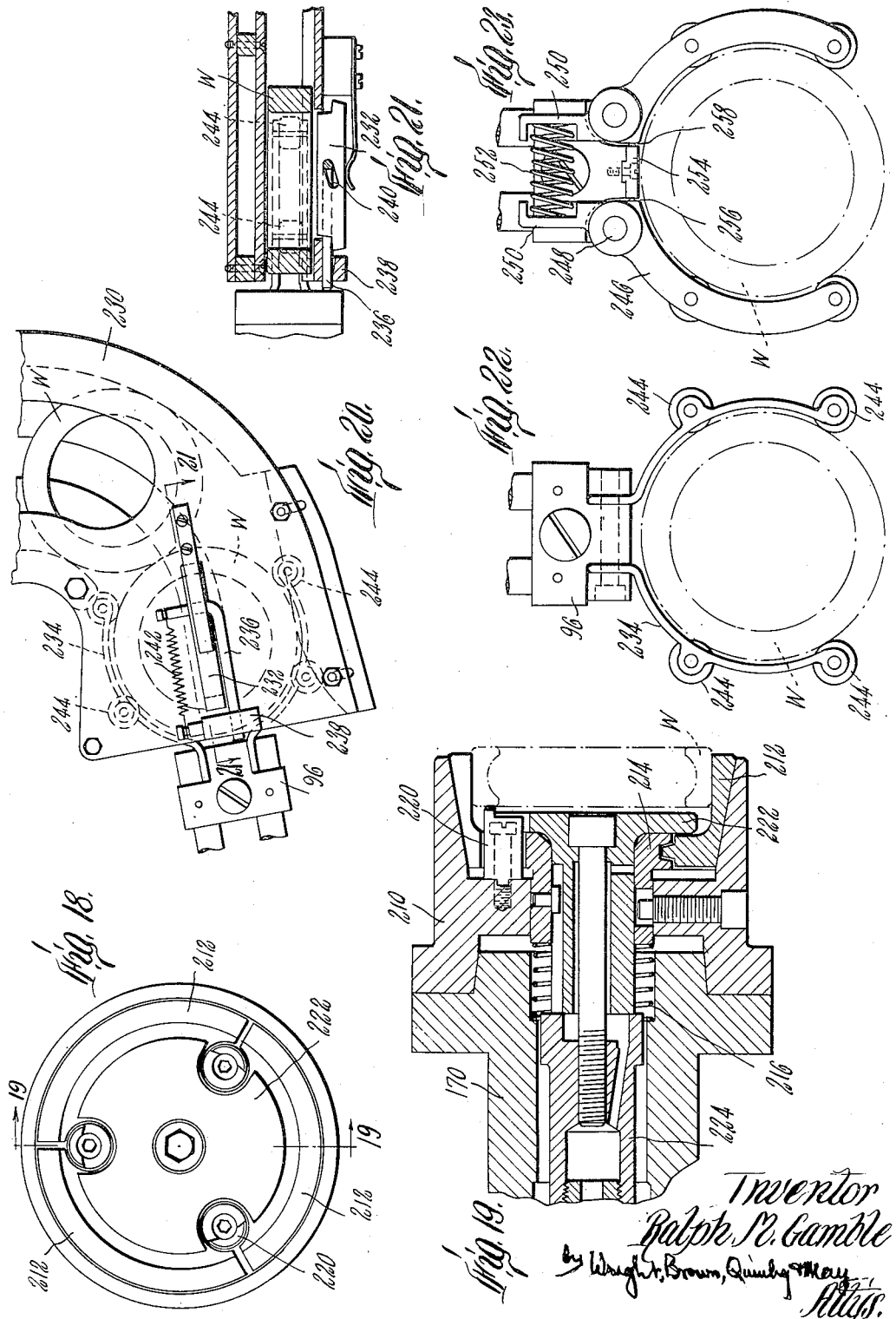
Inventor
Ralph M. Gamble Nov. 22, 1949 R. M. GAMBLE 2,489,023
LATHE
Filed Jan. 24, 1946 6 Sheets-Sheet 6
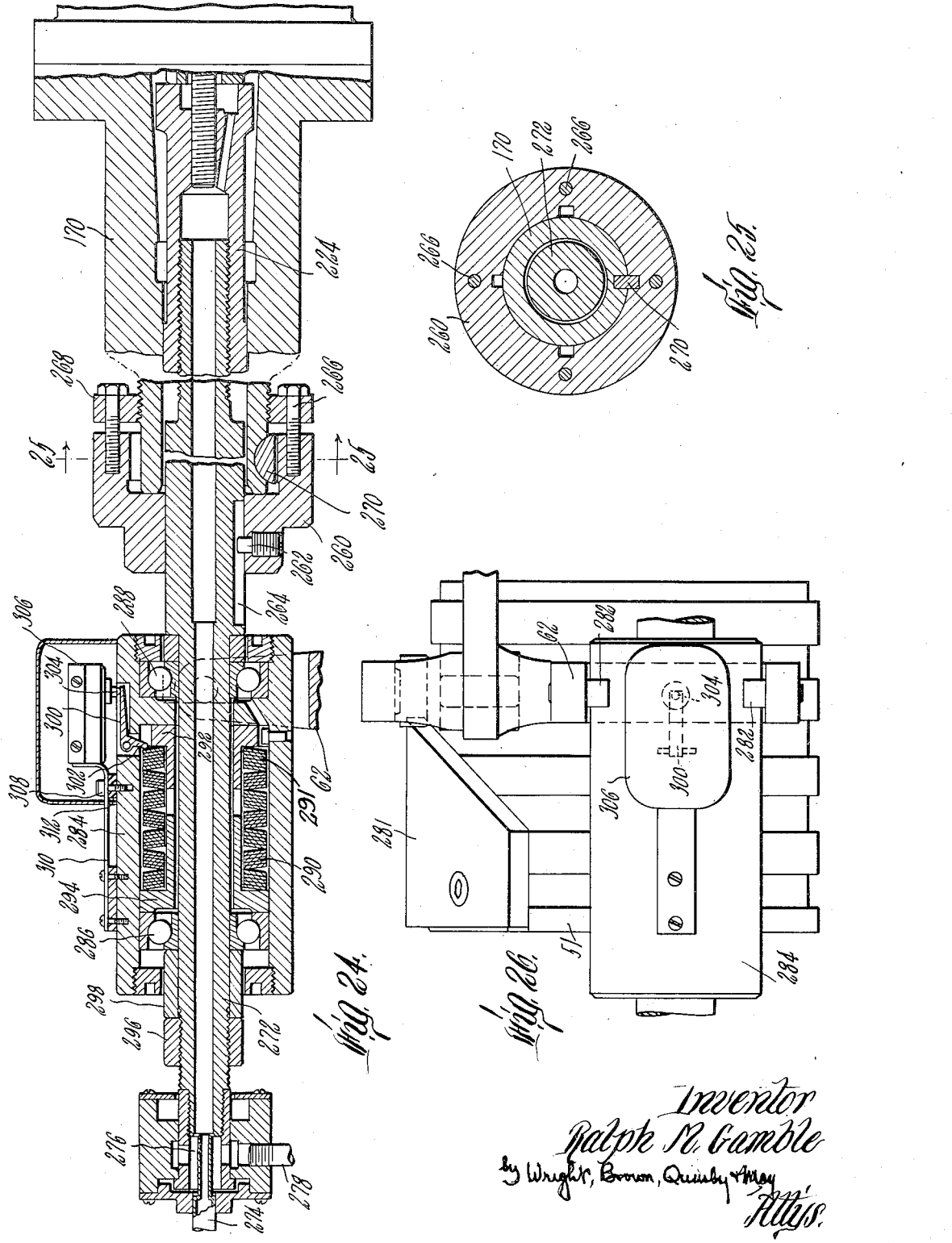

Patented Nov. 22, 1949

2,489,023

UNITED STATES PATENT OFFICE 2,489,023

LATHE

Ralph M. Gamble, Springfield, Vt., assignor to Jones & Lamson Machine Company, Springfield, Vt., a corporation of Vermont Application January 24, 1946, Serial No. 643,114

6 Claims. (Cl. 279—1)

The invention relates to improvements in automatic lathes such as the well-known Fay lathe, and more particularly to mechanism for inserting, chucking, and discharging work pieces in the form of rings, such, for example, as a ball-bearing race. Work of this kind often requires machining on both of its side faces as well as on its inner or outer periphery. According to the present invention, two mutually adjacent lathes are provided with an interfeed designed to take work pieces from one lathe after one face has been cut and deliver such pieces to the other lathe in reversed position for operation on the other face.

The increasing use of carbide-tipped tools has so speeded up cutting and shaping operations that in many jobs it has become difficult for a single attendant to feed work to and remove it from the machine at a rate equal to that of the operation performed by the machine. Hence, provision is made for the automatic feeding of individual work pieces to the machine from a suitable chute, hopper or other source of supply and the automatic removal of work pieces from the machine.

The invention also includes improved devices for chucking work pieces of the kind described, the lathes being employed without tailstocks so as to permit free access of the tools to one side face of the work.

For a more complete understanding of the invention, reference may be had to the following description of certain embodiments thereof, and to the drawings, of which:

Figure 2 is a partial sectional view on the line 2—2 of Figure 1, showing the interfeed between this lathe and a second lathe (not shown);

Figure 3 is a section on the line 3—3 of Figure 2;

Figure 4 is a section on the line 4—4 of Figure 3;

Figure 5 is an elevational view of one of the carrier arms shown in Figure 2;

Figure 6 is a section on the line 6—6 of Figure 5;

Figure 7 is an elevational view of a portion of the supply hopper as viewed in the direction indicated by the line 7—7 of Figure 2;

Figure 8 is a section on the line 8—8 of Figure 2;

Figure 9 is similar to Figure 8 except that it shows a different stage of operation;

Figure 10 is a sectional view of the chuck, carrier fingers and work, showing also the pusher and tools of the first lathe;

Figure 11 is like Figure 10 but with the work piece on the chuck;

Figure 12 is a plan view of the chuck and tools of the second lathe;

Figure 13 is a plan view of the chuck and pusher, with the work and carrier fingers shown in section;

Figure 14 is a sectional view of the parts shown in Figure 13, with the work piece ejected from the chuck;

Figure 15 is a sectional view of the chuck shown on a larger scale and in more detail;

Figure 16 is a section on the line 16—16 of Figure 15;

Figure 17 is a section on the line 17—17 of Figure 15;

Figure 18 is an end view of another form of chuck;

Figure 19 is a section on the line 19—19 of Figure 18;

Figure 20 is a fragmentary elevation of a modified form of work-receiving mechanism;

Figure 21 is a section on the line 21—21 of Figure 20;

Figure 22 is an elevational view of a carrier head having a modified form of fingers;

Figure 23 shows another modified form of carrier head and fingers;

Figure 24 is a sectional view of a spindle with chuck-operating mechanism;

Figure 25 is a section on the line 25—25 of Figure 24;

Figure 26 is a plan view of a portion of the mechanism shown in Figure 24.

Figure 1:
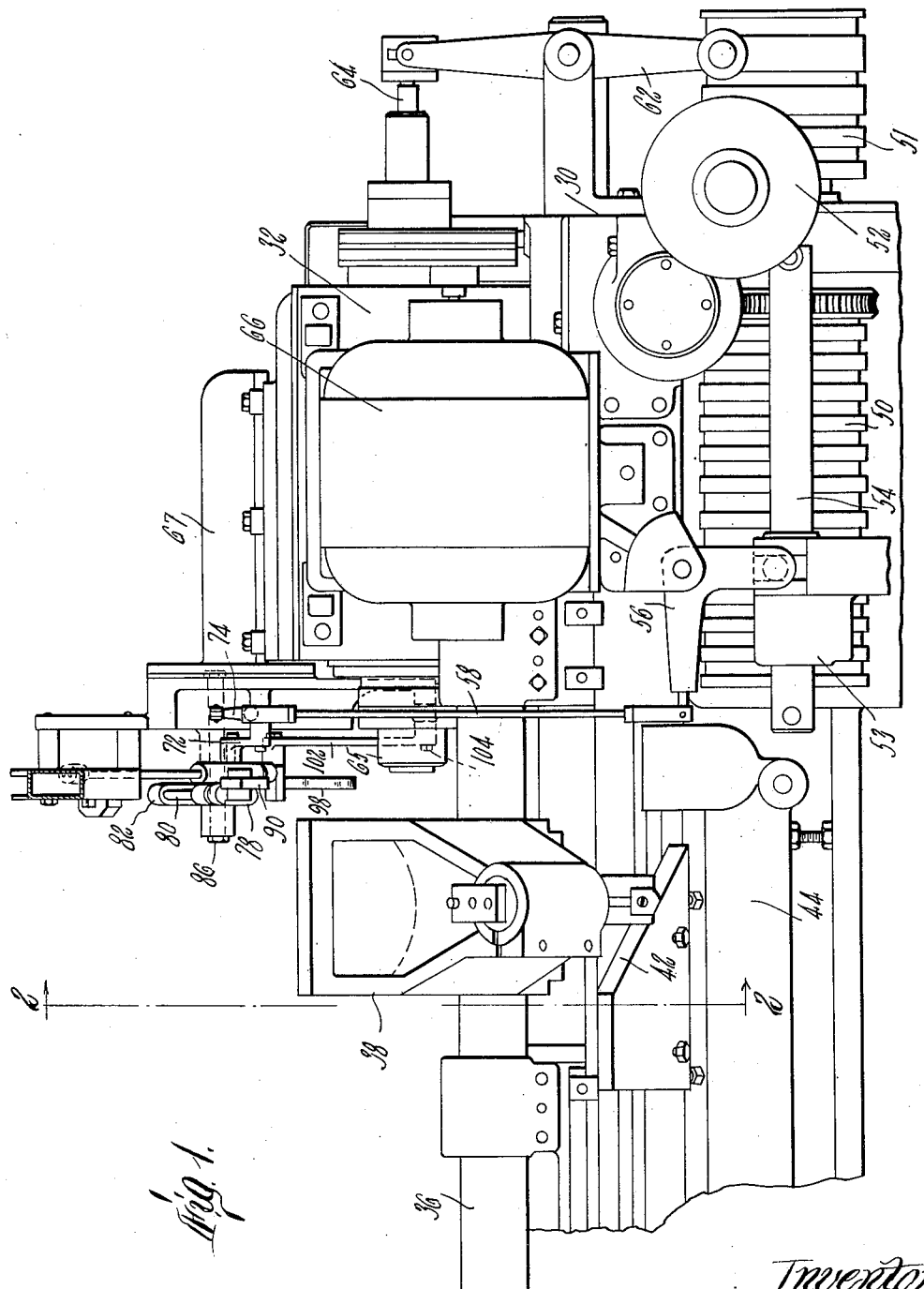
Figure 1 is a rear elevational view of a Fay lathe embodying the invention.

In Figures 1 and 2 is illustrated a lathe of the type commonly known as the Fay automatic lathe. This comprises a bed 30 mounted on a suitable base (not shown). On the bed is mounted a headstock 32, no tailstock being employed on this machine as it is desirable to mount some of the tools in such a way as to get at the interior of a ring-like work piece, such as one of the members of a ball bearing race. The lathe includes a center tool bar 34 which is axially movable and is also rockable, and a back tool bar 36 on which is mounted a tool bar 38 rockable with the bar 36 about its axis. The arm 38 carries one or more tools 40 which are moved to and from the work by the rocking movement of the arm 38. This rocking movement is produced by a former cam 42 which is engaged by a follower on the lower end of the arm 38. The cam is mounted on a cam carriage 44 which is reciprocable in the usual manner by a cam (not shown) on one of the cam drums of the lathe. Mounted on the center bar 34 is a tool carriage 46 carrying one or more tools, such as the tools 47, 48, and 49 shown in Figure 10 which can travel in a direction parallel to the axis of the work as the center bar is moved axially or can move toward or from the work laterally of its axis when the center bar is rocked.

Figure 1 illustrates two cam drums 50 and 51 which are driven through reduction gearing by a motor 52 and on which are adjustably mounted suitable cams for the operation of certain parts of the machine including the center bar 34 and back bar 36. The cam drum 50 has a cam which causes the reciprocation of a slide 53 supported on a guide bar 54, which rocks a bell crank 56, the bell crank being operatively connected through a rod 58 to a carrier mechanism adapted to transfer a work piece from a receiving station to a loading position in line with the lathe spindle and at the same time to transfer a work piece from the loading position to a delivery station, these transfer movements being simultaneous. This transfer mechanism is hereinafter described in more detail.

Cams on the drum 51 operate a lever 62 which in turn moves an ejector rod 64 in one direction to close the chuck 65 and in the opposite direction to open the chuck and to eject the work which has been operated upon. Other cams on the drum 51 open and close the control switch (not shown) for the usual motor 66 which drives the spindle.

The carrier mechanism is supported by a bracket 67 which is mounted on the top of the headstock 32. The connecting rod 58 is connected to an arm 68 of a crank which is pivoted at 70 and which has also two other arms 72 and 74 rockable therewith. The arm 72 is pivoted at 76 to a carrier head 78 which is mounted at one end of a slide member 80. The latter comprises two parallel rods which are secured together in spaced relations by the carrier head 78 at one end and by a cross piece 82 at the other end. These rods slide through a center block 84 which is rockably mounted on a pivot 86 projecting from the bracket 66. When the crank 68 is rocked by the connecting rods 58, the pivot 76 swings in an arc about the pivot 70 and the rods 80 slide through the central block 84. The carrier head 78 includes a pair of spring fingers 90 having opposed arcuate portions adapted to embrace a circular work piece with a yielding grip. The ends of these spring fingers are spaced sufficiently apart to spring over a work piece when they are pressed against the periphery thereof.

Slidable through another central block 91 (Figure 5) on the pivot 86 are a pair of rods 92 which are held together in spaced relation by a cross piece 94 at one end and by a carrier head 96 at the other end. This carrier head has a pair of spring fingers 98 similar in size and shape to the spring fingers 90. The carrier head 96 is pivotally connected at 100 to an arm 102 which swings around a pivot 104 together with a shorter arm 106, the latter being connected to the arm 74 by a connecting rod 108. By this construction the arms 72 and 102 rock simultaneously about their respective centers or axes 70 and 104. The axis 86 of the central blocks 84 and 91 and the axes 70 and 104 are located in such a way as to cause the carrier fingers 98 to move from a receiving station 110 to a loading station in line with the chuck 65 so that work pieces may be transferred one by one from the receiving station to the loading station. In like manner, the carrier head 78 is swung through the path such that the carrier fingers 90 move back and forth between the loading station and a delivery station 114. The linkage formed by the parts hereinbefore described and illustrated in Figure 2 is such that when the fingers 98 move from the receiving station 110 to the loading station, the carrier fingers 90 move at the same time from the loading station to the delivery station 114.

In Figure 2 a hopper 116 is shown, this hopper having parallel walls spaced to hold a supply of work pieces in a common plane. These work pieces descend by gravity into a chute at the receiving station 110, the lowermost work piece being in a position to be engaged by the spring fingers 98. The structure at the delivery station 114 includes a storage hopper 118 which is adapted to receive partly tooled work pieces delivered from the first machine. Leading from this hopper 118 is a chute 120 through which the work pieces travel edgewise and which, as illustrated in Figure 2, is twisted through an angle of 180° so that by the time it reaches the receiving station 122 of the next lathe the work pieces in the chute have been reversed, the other face of the work piece being thus presented to the tools in the second lathe. Figure 2 illustrates a portion of the transfer mechanism of the second lathe. The latter may be similar to the first lathe except for the tooling.

Figures 8 and 9 show the construction of the delivery station 114 to which work pieces are delivered by the carrier fingers 90. The work pieces shown in these figures are in the finished condition which they have when they leave the first lathe. One wall of the hopper 118 is cut away to form a slot to receive a portion of a latch member 124 which is pivoted at 126 on a suitable bracket 128 projecting from the wall of the hopper 118. The latch 124 is pressed by a spring 130 so that its upper end tends to enter the slot in the chute wall so that a shoulder 132 on the upper end of the latch can engage in the central space of a ring-like work piece W as shown in Figure 8. When the next work piece is brought up by the carrier head 78, it is thrust into the opening at the lower corner of the hopper 118 as indicated in Figure 9. The travel of the carrier head 78 with the fingers 90 pushes the work piece up to the position shown in Figure 8 whereupon the latch 124 swings over to prevent reverse movement of the work piece when the fingers 90 are retracted. Figure 2 illustrates the intermediate or neutral position occupied by the carrier members while the work piece is being operated on by the tools. When the tools have finished their stroke and have been retracted, the carrier mechanism is actuated by a cam on the drum 50 to move the fingers 90 down to the loading position so as to receive the work piece which has just been operated on. At the same time the fingers 98 move to the receiving station 110 where they snap over and grasp the next work piece. The carrier mechanism is thereupon actuated to move the fingers 90 with the work piece at the loading station to the delivery station 114 while the next work piece is simultaneously transferred from the receiving station 110 to the loading station.

When a work piece is transferred from the receiving station 110 to the loading station, a pusher is thereupon employed to push the piece from the fingers 98 into the chuck so that it can be gripped thereby. A pusher mechanism is illustrated in Figures 2, 3, and 4. As therein shown, the pusher comprises a pusher head 140 mounted on the end of an arm 142 which is fixed to a splined shaft 144. This shaft is slidably mounted in a splined sleeve 147 which is rockable in a fixed bearing 148. Projecting from one end of the sleeve is a fork 150 in which engages a pin 152 on the end of an arm 154 rockable with the tool shaft 36 and the tool arm 38. This pin and fork connection causes the shaft 144 to rock when the tool shaft 36 is rocked, the connection being such that the pusher head 140 swings into line with the chuck 65 when the tool 40 swings away from the work. Conversely, the pusher head 140 swings down away from the loading station to the position shown in Figure 2 when the tool arm 38 swings in a direction to move the tool 40 into work engaging position.

Axial movement of the pusher shaft 144 is imparted by the tool bar 34. For this purpose a sleeve 156 is loosely mounted on the bar 34 but is held against axial movement relative thereto by a washer 158 bearing against a shoulder of the bar and by threaded collars 160 at the other end. Thus the center bar 34 can rock within the sleeve 156 but when it moves axially it moves the sleeve with it and also the pusher assembly. As seen in Figure 3, movement of the pusher toward the right is away from the work. Movement toward the left results in pushing the work from the carrier fingers into the chuck 65. In order to avoid damage to the work or to the machine in case the work is not properly positioned in the carrier fingers, the movement of the pusher head 140 toward the left is yielding. For this purpose, the sleeve 156 is not rigidly connected to the shaft 144 but is connected through a spring 162 which is compressed between a washer 164 mounted on the end of the shaft 144 and a thimble 166 which is carried by a short arm 168 projecting laterally from the sleeve 156. The thimble 166 is slidable on the reduced end portion of the shaft 144 and moves with the sleeve 156 so that if the pusher head 140 meets with an obstruction, the spring 162 can take up the remaining movement of the thimble 166.

Figures 10 to 17 illustrate a chuck for holding a work piece of ring shape by gripping it from within so that tools can operate on its outer periphery. The chuck also includes an ejector mechanism for discharging the work from the chuck jaws after the tools have operated thereon. To the end of the spindle 170 is secured the chuck body 65 by suitable bolts or otherwise. A set of expanding jaws 174 is mounted at the forward end of the chuck body (see Figures 15 and 17), these jaws being held in place by a circular spring 176 which is located in a groove in the outer peripheral faces of the jaws 174. The forward end of the chuck body 65 is somewhat tapered as at 178, the inner faces of the jaws 174 having inclined surfaces riding on the tapered surface 178 so that when the jaws are retracted toward the chuck body they are forced apart by the camming effect of the tapered surface 178, this expansion of the jaws 174 resulting in a firm gripping of the work piece by contact with its interior peripheral surface. The jaws 174 are retracted by a central rod 180 having a head 182 with a flaring surface engaging a correspondingly inclined surface portion at the interior of the jaws 174. Radially extending studs 184 project between the jaws 174 to guide them in their expanding and contracting movements. The rod 180 has a head 186 which is engaged by a thimble 188 secured to an ejector shaft 64. Movement of the shaft 64 toward the left, as shown in Figure 15, retracts the rod 180 and results in the expansion of the jaws 174. Conversely, movement of the ejector rod 64 toward the right allows the jaws to be contracted by the spring 176. Such movement also results in the ejection of the work by means of a pair of ejector pins 192 which extend toward the right from the thimble 188.

The sequence of steps of operation of the parts thus far described in handling work pieces is illustrated in Figures 10 to 14. The carrier fingers 98 bring a work piece W from the receiving station to the loading station in line with the chuck axis as indicated in Figure 10, the spindle 65 being stationary. The pusher 140 thereupon moves the work piece to the left on to the chuck jaws 174 as shown in Figure 11. The ejector rod 64 is then retracted to expand the chuck jaws so as to grip the work piece firmly. The pusher is retracted and swung aside as hereinbefore described to make room for the travel of the tools, and the carrier fingers 98 are returned to the neutral position shown in Figure 2. The motor 66 is then started by the closing of a cam-operated switch to rotate the spindle.

Figures 10 and 11 illustrate tools which may be employed in the first of the two lathes. The tool 40 which is carried by the tool arm 38 is a facing tool which is made to travel across the exposed end face of the work piece. The tool carriage 46 has three tools 47, 48, and 49. The tool 47 cuts a peripheral groove 194 in the edge of the work piece adjacent to the right hand face. The tool 48 faces the right hand face of the work piece. The tool 49 rounds the inner edge at the right hand face of the work piece. After these operations have been performed on the first lathe, the partially finished work piece is discharged, reversed, and delivered to the second lathe. The second lathe may be similar in structure to the first lathe except that different tools are mounted thereon for the remaining steps of finishing the work piece. As shown in Figure 12, the tool arm 38 of the second lathe carries two tools 196 and 198 which cut small chamfers on the periphery of the work piece. A tool 200 carried by the same arm finish faces the right hand face of the reversed work piece. The tool carriage 46 of the second lathe has three tools 202, 203, and 204. Of these, the tool 202 cuts a groove in the edge of the work piece similar to the groove 194. The tool 203 cuts a circular channel in the periphery of the work piece, and the tool 204 rounds the inner edge of the piece, the finished piece being illustrated in section in Figures 13 and 14.

After a tooling operation in either machine, the tools are retracted from the work piece and the spindle motor 66 is stopped, whereupon the carrier fingers 98 are moved into position to receive the work piece and the pusher 140 is also moved into position to limit the travel of a work piece when it is ejected from the chuck jaws. The positions of the carrier jaws and the pusher when the work piece is ready to be ejected are illustrated in Figure 13. Actuation of the ejector rod 64 then pushes the work until it is stopped by the pusher 140, this being when the work is between the fingers 98 of the carrier. The carrier mechanism is then operated to transfer the work from this station to the delivery station where it is discharged into the delivery hopper, A chucking mechanism in which some of the parts are modified to receive a ring-like work piece on the interior of which the tools are to operate, is illustrated in Figures 18 and 19. To the spindle 170 is secured a chuck body 210 which is hollow and in which are slidably mounted a set of chuck jaws 212. The inner surface of the chuck body 210 is flared at its forward end, the outer surface of the chuck jaws 212 being similarly inclined so that the chuck jaws are cammed inwardly when they are retracted. Operation of the jaws is by a thimble 214 which is slidable in the interior of the chuck body 210. A spring 216 is mounted behind the thimble to press it outward so that when the chuck jaws are released it will tend to move forward and to release the work piece. Suitable stops 220 are mounted within the chuck body 210. These are arranged to be engaged by a face of the work piece W when the work piece is pushed into the chuck by the pusher. The stops 220 are located in notches in the flange of an ejector head 222, the latter being secured to the ejector rod 224. As shown in Figure 19, the ejector head 222 engages the forward end of the thimble 214 so that when the ejector rod is retracted toward the left the head moves the thimble 214 in the same direction retracting the jaws 212 which are thus cammed inwardly against the periphery of the work piece, with the result that the work piece is firmly clamped in position until released by movement of the ejector rod 224 to the right.

Figures 20 and 21 show a modified form of release mechanism for releasing pieces of work at the receiving station when the carrier fingers engage the piece of work next to be taken to the loading position in the lathe. In Figure 20 the work pieces are shown as coming to the receiving station and through a chute 230. The end work piece in the chute is normally held in position by a latch 232 which enters the aperture in the work piece and prevents it from moving any considerable distance in either direction. Thus, when the carrier fingers 234 are pushed against the periphery of the work piece so as to spring over the periphery and grip the same, the work piece is prevented by the latch 232 from being pushed back. The work piece must then be released so that it can be withdrawn by the carrier fingers. Such release is brought about during the final portion of the approaching movement of the carrier head 96 to the position shown in Figure 20 by the engagement of the head with the end of an L-shaped pin 236 which is slidably mounted in a block 238 on the side wall of the chute adjacent to the end thereof. The up-turned portion of the pin 236 passes through a slot 240 in the latch block 232, this slot being inclined with respect to the edge of the latch 232, as illustrated in Figure 21, so that when the pin 236 is pushed inward the up-turned portion thereof rides in the slot and cams the latch 232 outward so that it clears the work piece and leaves the work piece free to be retracted. As soon as the carrier starts to remove the work piece, the pin 236 is retracted by a spring 242 so that as soon as the next work piece moves into the end position, the latch 232 is ready to spring into place and lock the work piece against movement in either direction until released as described. As shown in Figure 22, the carrier fingers 234 differ from the fingers 96 and 98 by the addition of small rollers 244 which are located in such a manner as to reduce the frictional resistance of the work piece when the fingers are sprung about its periphery.

Figure 23 illustrates a modified form of carrier head which has thereon rigid fingers 246, each of which is pivoted to the head as at 248. The fingers have two short opposed arms 250 which, as is evident from Figure 23, move toward each other when the fingers 246 are spread apart. Such movement is opposed by a stiff spring 252 which yields sufficiently to allow the fingers 246 to snap over the periphery of a work piece when the fingers are pushed against it as hereinbefore described. The movement of the fingers 246 toward each other is limited by a spacer block 254 which is abutted by the fingers at 256 and 258.

A modified form of spindle with a safety device is shown in Figure 24. The spindle 170 is splined to the ejector rod 224 through a collar 260 which carries a pin 262 riding in a longitudinal slot 264 and which is secured to a reduced end portion of the spindle 170 by bolts 266 which draw the collar tightly against the end of the spindle 170, the bolts being supported by a ring 268 threaded on the spindle 170. The collar is splined to the spindle by a key 270.

The ejector rod 224 is hollow. As shown in Figure 24, it includes two sections which are screwed together, the forward section being screwed on to a long stem 272 which is connected to an air duct 274. Around this air duct is a chamber 276 communicating with a supply pipe 278 through which liquid coolant can be supplied. The air duct 274 opens into the interior of the hollow spindle 272 at one end of the chamber 276 so that it has an aspirating effect and thus draws coolant into the passageway in the spindle when the air is turned on. The mixed air and coolant travel through the spindle to the forward end thereof to clean out the chuck when the work piece is being removed.

The safety device shown in Figure 24 comprises a spring mechanism for holding the chuck jaws yieldingly in their closed position when the chuck is closed and for preventing the spindle motor from starting when no work is in the chuck or when the work is insufficiently gripped. The chuck is operated by relative longitudinal movement between the ejector rod 224 and the chuck body 170. The rod is returnd by a pusher actuated by the lever 62 which is rocked by a cam 281 (Figure 26). The lever has pins 282 which fit in lateral recesses in a housing 284. Since this housing does not rotate, suitable ball bearings 286 and 288 are provided between the housing and shank of the ejector rod. When the forked lever 62 is swung toward the left to close the chuck, it moves the housing 284 to the left. This presses the ejector rod shank 272 toward the left, the pressure being applied through a series of stacks of Belleville washers 290, including a monitor stack 291, which are located between opposed faces of a loose flanged sleeve 292 pressed by the housing 284 and a second loose flanged sleeve 294 which is buttressed by a nut 296 adjustably mounted on the ejector rod shank 272. The washers in the stacks are characterized by the fact that in their unstressed condition they are cup-shaped and are resilient. They can be pressed to the usual flat shape, but when the pressure is removed they flex again to their normal cup-shape. The thrust between the sleeve 294 and the nut 296 is through the ball bearing 286 and a collar 298. The washers 290 are under constant compression even when the chuck jaws are open, such compression serving to flatten the washers to some extent from their unstressed shape. When the housing 284 is moved axially to close the chuck, the distance of such movement is arranged to be slightly more than is required to close the chuck on a work piece. This slight additional movement of the housing after the movement of the rod 224 has been stopped by the engagement of the chuck jaws on the work results in a further compression and resultant partial flattening of the washers. A bell crank 300 is mounted on the housing 284 so that its short arm 302 bears as a feeler against the convex end of the monitor stack 291 of washers and its long arm bears against the operating plunger 304 of a switch 306 which is in the spindle motor circuit. Hence when the cam operated switch in the spindle motor circuit is closed to start the spindle motor, the switch 306 must also be closed or the motor will not start. As is evident from Figure 24, the angular position of the bell crank 300 depends on the degree of flattening of the monitor stack of washers with which it is in contact. The switch is so adjusted that when the flattening of the washers exceeds a certain degree, the switch is held closed, but when the pressure on the washers is relieved to permit them to flex beyond the critical value, the bellcrank rocks sufficiently to open the switch 306. The critical degree of flexing necessary to open the switch is dependent on the position of the switch relative to the bellcrank. This position is adjustably determined by means of an adjusting screw 308 the head of which bears on a spring bracket 310. The bracket is anchored at one end, the switch 306 being supported by the other end. The screw 308 passes through the bracket at a point near the switch and extends through a washer 312 of rubber, or other resilient material into the wall of the housing 284. By means of the screw 308, which presses the bracket against the washer 312, the position of the switch can be finely adjusted to open when there is no work in the chuck or when the work piece is insufficiently gripped in the chuck. One possible cause of an insufficient grip is the breaking of a washer in one of the stacks. The breaking of a washer would reduce the resistance of its stack to compression. As a result, that stack would flatten to some extent and the other stacks would flex correspondingly. This flexing of the monitor stack would open the switch 306 as hereinbefore described. Since the monitor stack must flex to open the switch, it is desirable to avoid breakage in that stack. To this end the monitor stack has a greater number of washers than any of the other stacks. In the spindle shown in Figure 24, the monitor stack has six washers whereas the other stacks have five each. Since the compression load on each stack is the same as that on the others, and since the load on each stack is evenly divided among the individual washers therein (assuming the washers to be uniform), it follows that the load carried by individual washers in the monitor stack is less than that of individual washers in other stacks. Hence, the probability of breakage of a washer in the monitor stack is materially less than that of any of the other washers.

I claim:

1. In a lathe, a spindle having a chuck and an ejector rod retractible to close the chuck, means for retracting said rod comprising a collar adjustably fixed on said rod, two flanged sleeves on said rod forward of said collar, one of said sleeves bearing against said collar, a plurality of spring washers compressed between the flanges of said sleeves, a housing member bearing against the other said sleeve, and means for moving said housing member against said other sleeve to retract said rod by pressure transmitted through said spring washers.

2. In a lathe, a spindle having a chuck and an ejector rod retractible to close the chuck, means for retracting said rod comprising a collar fixed on said rod, two flanged sleeves on said rod forward of said collar, one of said sleeves bearing against said collar, a plurality of spring washers compressed between the flanges of said sleeves, a housing member bearing against the other said sleeve, means for moving said housing against said other sleeve to retract said rod by pressure transmitted through said spring washers, and automatic stop mechanism carried by said housing, said stop mechanism comprising a bell crank mounted in the housing and having an arm bearing against an end washer therein, an electric switch in said housing mechanically connected to said bell crank, said bell crank being rockable in response to excessive decrease in the compression of the spring washers to open said switch.

3. In a lathe, a spindle having a chuck and an ejector rod retractible to close the chuck, an electric motor for rotating the spindle, an auxiliary control switch for said motor, means for retracting said rod to close said chuck, said means having a resilient partially compressed member which is further compressible between the rod and its retracting means when the rod is actuated to close the chuck, and means responsive to a condition of compression in said member which is less than a predetermined minimum to open said switch.

4. In a lathe, a spindle having a chuck and an ejector rod retractible to close the chuck, an electric motor for rotating the spindle, an auxiliary control switch for said motor, means for retracting said rod to close said chuck, said means having a resilient, partially compressed member which is further compressible between the rod and its retracting means when the rod is actuated to close the chuck, said resilient member comprising a series of stacks of cupped washers, the stack at one end of the series having more washers than the other stacks, and means responsive to a condition of compression in said member which is less than a predetermined minimum to open said switch, said last named means including a feeler member pressed against the convex end of said stack of washers at the end of said series so as to be movable in response to flexing of said stack, said feeler member being in operative contact with said switch to operate the same by its motion.

5. A mechanism of the class described comprising two elongated members, one of which is axially movable relatively to the other to grip or release a work piece, a pusher adapted to move said movable member, said pusher and movable member having spaced opposed faces separated by a series of stacks of cupped washers normally under partial compression and subject to additional compression when the pusher is actuated to move the movable member, a feeler element mounted on said pusher and pressed against the convex end of the stack of washers at one end of said series, whereby said feeler moves in response to flexing of said washers, and a control device operated by movement of said feeler.

6. In a lathe, a spindle having a chuck and a hollow ejector rod therein retractible to close the chuck, said chuck having ducts communicating with the hollow in said rod, and fluid connections at the end of the rod remote from the chuck for the supply of air and coolant to the chuck through the rod and ducts.

RALPH M. GAMBLE.

REFERENCES CITED

The following references are of record in the file of this patent:

UNITED STATES PATENTS

| Number | Name | Date |
| --- | --- | --- |
| 1,879,656 | Brown | Sept. 27, 1932 |
| 1,936,401 | Lovely | Nov. 21, 1933 |
| 1,947,610 | McNamara | Feb. 20, 1934 |
| 1,981,260 | Yager | Nov. 20, 1934 |